(12) United States Patent
Reynolds et al.

(10) Patent No.: US 7,347,114 B2
(45) Date of Patent: Mar. 25, 2008

(54) TEMPLATE

(75) Inventors: Herbert M Reynolds, East Lansing, MI (US); Robert Kerr, Mason, MI (US); Raymond Brodeur, Okemos, MI (US); Khaldoun Rayes, Lansing, MI (US); Douglas Neal, Chelsea, MI (US); Yuntao Cui, Princeton, CT (US)

(73) Assignee: The Board of Trustees Operating Michigan State University, East Lansing, MI (US)

( * ) Notice: Subject to any disclaimer, the term of this patent is extended or adjusted under 35 U.S.C. 154(b) by 95 days.

(21) Appl. No.: 11/085,772

(22) Filed: Mar. 21, 2005

(65) Prior Publication Data

US 2005/0160842 A1 Jul. 28, 2005

Related U.S. Application Data

(60) Division of application No. 10/684,911, filed on Oct. 14, 2003, which is a continuation of application No. 08/949,213, filed on Oct. 10, 1997, now Pat. No. 6,840,125.

(60) Provisional application No. 60/032,940, filed on Dec. 9, 1996.

(51) Int. Cl.
*G01M 19/00* (2006.01)
(52) U.S. Cl. .................................................. 73/866.4
(58) Field of Classification Search ............... 73/866.4, 73/172, 865.4; 33/561.1, 561.3, 512; 297/181, 297/463.2; 280/801.1, 808
See application file for complete search history.

(56) References Cited

U.S. PATENT DOCUMENTS

| | | | |
|---|---|---|---|
| 3,147,617 A | 9/1964 | Kaptur, Jr. et al. |
| 3,778,104 A | 12/1973 | Kusters |
| 3,841,654 A | 10/1974 | Lewis |
| 4,026,041 A | 5/1977 | Kennedy |
| 4,242,802 A | 1/1981 | Jenner et al. |
| 4,335,918 A | 6/1982 | Cunningham |
| 4,578,875 A | 4/1986 | Vertin |
| 4,669,302 A | 6/1987 | Wagner et al. |
| 4,688,853 A | 8/1987 | Watts |
| 4,728,150 A | 3/1988 | Gaudreau, Jr. |
| 4,993,164 A | 2/1991 | Jacobsen |
| 4,998,354 A | 3/1991 | Silverman et al. |
| 5,018,790 A | 5/1991 | Jay |
| 5,060,393 A | 10/1991 | Silverman et al. |

(Continued)

FOREIGN PATENT DOCUMENTS

SU 508711 3/1976

OTHER PUBLICATIONS

Lee et al., "Review of Selected Literature Related to Seating", only pp. 1-3,18,22,111, Apr. 1990.*

(Continued)

*Primary Examiner*—Robert Raevis
(74) *Attorney, Agent, or Firm*—Howard & Howard Attorneys, P.C.

(57) ABSTRACT

A design template includes a torso section being one of a group of a 95$^{th}$ percentile male, 50$^{th}$ percentile male and 5$^{th}$ female having each being one of a group of an ERECT posture, a NEUTRAL posture and a SLUMPED posture.

4 Claims, 8 Drawing Sheets

U.S. PATENT DOCUMENTS

| | | | |
|---|---|---|---|
| 5,193,285 | A | 3/1993 | Heinrich et al. |
| 5,235,988 | A | 8/1993 | Johnson et al. |
| 5,375,610 | A | 12/1994 | LaCourse et al. |
| 5,456,019 | A | 10/1995 | Dowell et al. |
| 5,483,825 | A | 1/1996 | Greenbaum |

OTHER PUBLICATIONS

Author Unknown; Progress with Human Factors in Automotive Design: Seating Comfort, Visibility, and Safety; Published by Society of Automotive Engineers, Inc.; Feb. 1997 (SP-1242).

David F. Ekern, et al.; Kinetic Computer Modeling of Human Posture in Automotive Seats; Published by Society of Automotive Engineers, Inc.: pp. 125-133 (970592).

Robert Hubbard and Christopher Gedraitis; Biomechanically Articulated Chair Concept and Prototypes; Published by Society of Automotive Engineers, Inc,; Copyright 1997; pp. 117-124 (970591).

Barry L. Frost, III et al.; Development of Human Back Contours for Automobile Seat Design; Published by Society of Automotive Engineers, Inc.; Copyright 1997; pp. 107-115 (970590).

Devices for Use in Defining and Measuring Vehicle Seating Accomodation—SAE J826 Apr. 1980.

H.M. Reynolds, C.C. Snow, J.W. Young; Spatial Geometry of the Human Pelvis; Civil Aeromedical Institute, Mar. 1982.

W. Haas; Geometric Model and Spinal Motions of the Average Male in Seated Postures, Thesis, Mar./Apr. 1990.

T. Bush, F.T. Mills, K. Thakurta, R.P. Hubbard and J. Vorro; The Use of Electromyography for Seat Assessment and Comfort Evaluation; International Congress and Exposition, Feb. 1995 (950143).

Matthew P. Reed, Masatsugo Saito, Yasuo Kakishima, Nahm S. Lee & Lawrence W. Schneider; An Investigation of Driver Discomfort and Related Seat Design Factors in Extended Duration Driving; International Congress and Exposition; Detroit, MI Feb. 25- Mar. 1, 1995.

Matthew P. Reed and Lawrence W. Schneider; Lumbar Support in Auto Seats: Conclusions from a Study of Preferred Driving Posture; International Congress and Exposition, Detroit, MI Feb. 26-29, 1996.

Gary Monheit and Norman I. Badler; A Kinematic Model of the Human Spine and Torso: University of Penn.

Matthew P. Reed, Lawrence W. Schneider, Bethany A.H. EBY; Some Effects of Lumbar Support Contour on Driver Sealed Posture; University of Michigan.

Matthew P. Reed, Dawn Massle; Distribution of Automobile Trip Durations for Studies of Seat Comfort: University of Michigan; International Congress and Exposition; Detroit, MI Feb. 26-29, 1996.

Herbert M. Reynolds, James J. Rechtien, Grayson W. Marshall, Sally Marshall; Spinal Curvature of Young Adult Females.

Herbert M. Reynolds, Robert P. Hubbard; Anatomical Frames of Reference and Biomechanics; Department of Biomechanics; Michigan State University Human Factors: 1980-22(2) 171-176.

G.B.J. Anderson, M.D., Ph.D., R.W. Murphy, M.D., R. Ortengren, Ph.D., A.L. Nachemson, M.D., Ph.D.; The Influence of Backrest Incilnation and Lumbar Support of Lumbar Lordosls; Spine vol. 1, No. 4; Jan./Feb. 1979.

R.J.G. Anderson, R. Ortengren, A. Nachemson, G. Elistrom; Lumbar Disc Pressure and Myoelectric Back Muscle Activity During Sitting: IV Studies on a Car Driver's Seat; Scand J. Rehab Med 6:128-133; 1974.

F.W. Babbs, T.I. Cox; A Design Layout and Method for Relating Seating to the Occupant and Vehicle; Ergonomics, vol. 22, No. 2,227-234; 1979.

Herbert M. Reynolds; Erect, Neutral and Slup Sitting Postures: A Study of the Torso Linkage System from Shoulder to Hip Joint; Oct. 1994.

* cited by examiner

TEMPLATE

This application is a divisional application of copending U.S. application Ser. No. 10/684,911 filed on Oct. 14, 2003, which is a continuation of U.S. application Ser. No. 08/949,213 filed Oct. 10, 1997 (now U.S. Pat. No. 6,840,125) which claims priority to and all benefits of the copending provisional application having U.S. Ser. No. 60/032,940, filed Dec. 9, 1996 entitled SEAT DESIGN TEMPLATE.

BACKGROUND OF THE INVENTION

1. Field of the Invention

The present invention relates generally to two-dimensional templates and, more particularly, to a two-dimensional design template used for designing, evaluating and measuring human occupant accommodation and seating in a seated environment.

2. Description of the Related Art for Automotive Vehicle Seats

Automotive vehicle seats have three primary functions: (1) position occupant for the driving task; (2) support comfortable healthy sitting postures; and (3) protect occupant upon vehicle impact. A deformable pad on a mechanically adjustable seat frame accomplishes the first function and the second function is accomplished through the geometrical and mechanical properties of the deformable pad composed of padding, suspension and upholstery. The third function is accomplished by seat and restraint systems to restrain the occupant during a vehicle impact. The first two functions determine the greatest portion of the occupant's perceived level of comfort. Position has been considered a primary determinant of occupant comfort and posture has been relegated to the occupant's ability to adapt to the vehicle environment. A major function of seat position and its supporting surfaces is, however, to support the occupant's posture. Thus, there is a need in the art to provide a design tool for automotive vehicle seats.

It is known in the automotive manufacturing industry that seat design relies on a tool built in the early 1960's to represent the position of the hip joint (SE H-point) and leg links for locating the position of the vehicle occupant in the occupant compartment of an automotive vehicle. This tool is known as "Oscar". Oscar is not constructed for seat design but has become an industry standard because there is no suitable tool that identifies the location of the occupant's torso in the seat. As stated in Volume IV, 1984, SE Handbook as follows:

"The devices described in this standard are intended for applications concerning seated driver side or center occupant accommodation spaces only and are not to be construed as instruments which measure or indicate occupant capabilities or comfort." (p. 24-27).

One disadvantage of the above tool is that the point of greatest deflection in the deformable pad or seat cushion is defined on the thigh segment which means that the location of this point is dependent upon thigh angle. The greatest deflection in the seat cushion, however, is under the pelvis and is defined by the position and posture of the torso. Another disadvantage with the above tool for use as a seat design tool is the posture of the torso in the above tool is undefined. Since the above tool was built from measurements of men sitting in a bench seat, it is reasonable to assume that the posture is slouched. Current seats are built with the intent of supporting a healthy erect posture in the back. The above tool does not provide any information regarding the location of the anatomical structures that define this posture. Yet another disadvantage of the above tool is that the contour of the interface between occupant and seat does not have contours that represent the deformed centerline contour of the occupant/seat interface.

SUMMARY OF THE INVENTION

It is, therefore, one object of the present invention to provide a design template.

It is another object of the present invention to provide seat designers with a design template that accurately represents the centerline position and posture of the occupant.

It is yet another object of the present invention to provide a design template that incorporates posture as part of the geometric representation of the occupant.

It is still another object of the present invention to provide a design template that is anatomically and biomechanically correct to represent typical occupants.

It is a further object of the present invention to provide a design template that correctly describes the deformed shape of the interface between occupant and seat and describes the location of anatomical details relative to these contours.

It is yet a further object of the present invention to provide a method for designing a seat with a design template.

It is a still further object of the present invention to provide a method of using a design template to design a vehicle seat.

It is another object of the present invention to define the properties of a seat designed by the design template.

It is yet another object of the present invention to define accommodation properties of an occupant restraint system for a seat using the design template.

It is still another object of the present invention to define the geometry and location of structures in a seat that restrain occupant motion in a vehicle collision.

It is a further object of the present invention to provide a method of establishing occupant accommodation criteria in a vehicle package based on a predetermined class of vehicles using the design template.

To achieve the foregoing objects, the present invention is a design template. The design template includes a torso section being one of a group of a $95^{th}$ percentile male, $50^{th}$ percentile male and $5^{th}$ percentile female having each being one of a group of an ERECT posture, a NEUTRAL posture and a SLUMPED posture.

Also, the present invention is a method for designing a seat including selecting at least one design template having a torso section being one of a group comprising a $95^{th}$ percentile male, $50^{th}$ percentile male and $5^{th}$ percentile female having each being one of a group comprising an ERECT posture, a NEUTRAL posture and a SLUMPED posture and having a leg section. The method also includes forming load supporting contours of the seat for the at least one design template and forming unloaded contours of the seat for the at least one design template.

Further, the present invention is a method of using a design template to design a vehicle seat including providing at least one design template having a torso section being one of a group comprising a $95^{th}$ percentile male, $50^{th}$ percentile male and $5^{th}$ percentile female having each being one of a group comprising an ERECT posture, a NEUTRAL posture and a SLUMPED posture. The method includes establishing occupant accommodation criteria based on positioning the at least one design template in a predetermined class of vehicles to define seat height and seat track displacement to accommodate each design template on a seat having a seat cushion and a seat back in a vehicle representing the vehicle package criteria. The method also includes defining at least one from a group comprising unloaded contours on the seat at $S^U$, $L^U$, $I_D{}^U$ and $T^U$. The method further includes defining at least one from a group comprising a seat back height, seat cushion length, head restraint position, thorax support, lumbar support, seat back bite line region, seat cushion bite line region, seat cushion bolster (e.g., waterfall region) and seat suspension for the seat relative to the design template.

Additionally, the present invention is a seat including a seat cushion, a seat back associated with the seat cushion, and at least one from a group comprising a seat back height, seat cushion length, head restraint position, thorax support, lumbar support, seat back bite line region, seat cushion bite line region and seat suspension being defined for the seat cushion and the seat back relative to a design template having a torso section being one of a group comprising a $95^{th}$ percentile male, $50^{th}$ percentile male and $5^{th}$ percentile female having each being one of a group comprising an ERECT posture, a NEUTRAL posture and a SLUMPED posture and having a leg section.

Also, the present invention is an occupant restraint system for a seat including a lap belt being anchored to vehicle structure to extend below an anterior superior iliac spine and above an anterior inferior iliac spine for a design template with a torso section having an ERECT posture. The occupant restraint system also includes a shoulder belt being anchored to vehicle structure to extend between a first predetermined distance from a centerline of the seat to a shoulder joint for a design template with a torso section being one of a group comprising a $5^{th}$ percentile female, a $95^{th}$ percentile male and a $50^{th}$ percentile male and a second predetermined distance from the centerline of the seat to a neck/shoulder junction for the design template with the torso section being one of the group of the $5^{th}$ percentile female, $50^{th}$ percentile male or the $95^{th}$ percentile male.

Further, the present invention is a method of establishing occupant accommodation criteria in a vehicle package based on a predetermined class of vehicles including providing a design template having a torso section being one of a group comprising a $95^{th}$ percentile male, $50^{th}$ percentile male and $5^{th}$ percentile female having each being one of a group comprising an ERECT posture, a NEUTRAL posture and a SLUMPED posture and having a leg section. The method includes defining an accelerator to provide a heel point of the leg section and defining deflection of the seat whether it is high deflection (soft), medium deflection (medium) or low deflection (hard). The method also includes positioning the design template in the vehicle such that the heel of the leg section is at the heel point and the angles of the leg section, i.e., ankle, knee and thigh, are within their predetermined comfort ranges and establishing a seat height from the floor to the bottom of the torso section at $I_D$. The method further includes establishing an H-point reference point (HptRP) relative to the heel point in a vehicle axis system by the design template.

One advantage of the present invention is that a design template is provided to design, evaluate and measure vehicle occupant accommodation. Another advantage of the present invention is that a design template is provided to represent the occupant that incorporates posture as part of their geometric representation of the occupant. Yet another advantage of the present invention is that the design template correctly represents the anatomy, biomechanics, and anthropometry of typical human occupants and is simple to use. Still another advantage of the present invention is that the design template accurately defines the contact contours between the occupant and seat. A further advantage of the present invention is that a seat can be designed with the design template to provide support and comfort to a human body occupant. Yet a further advantage of the present invention is that the design template can be used to design an occupant restraint system for a seat. A still further advantage of the present invention is that the design template can be used to establish occupant accommodation criteria in a vehicle package based on a predetermined class of vehicles.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
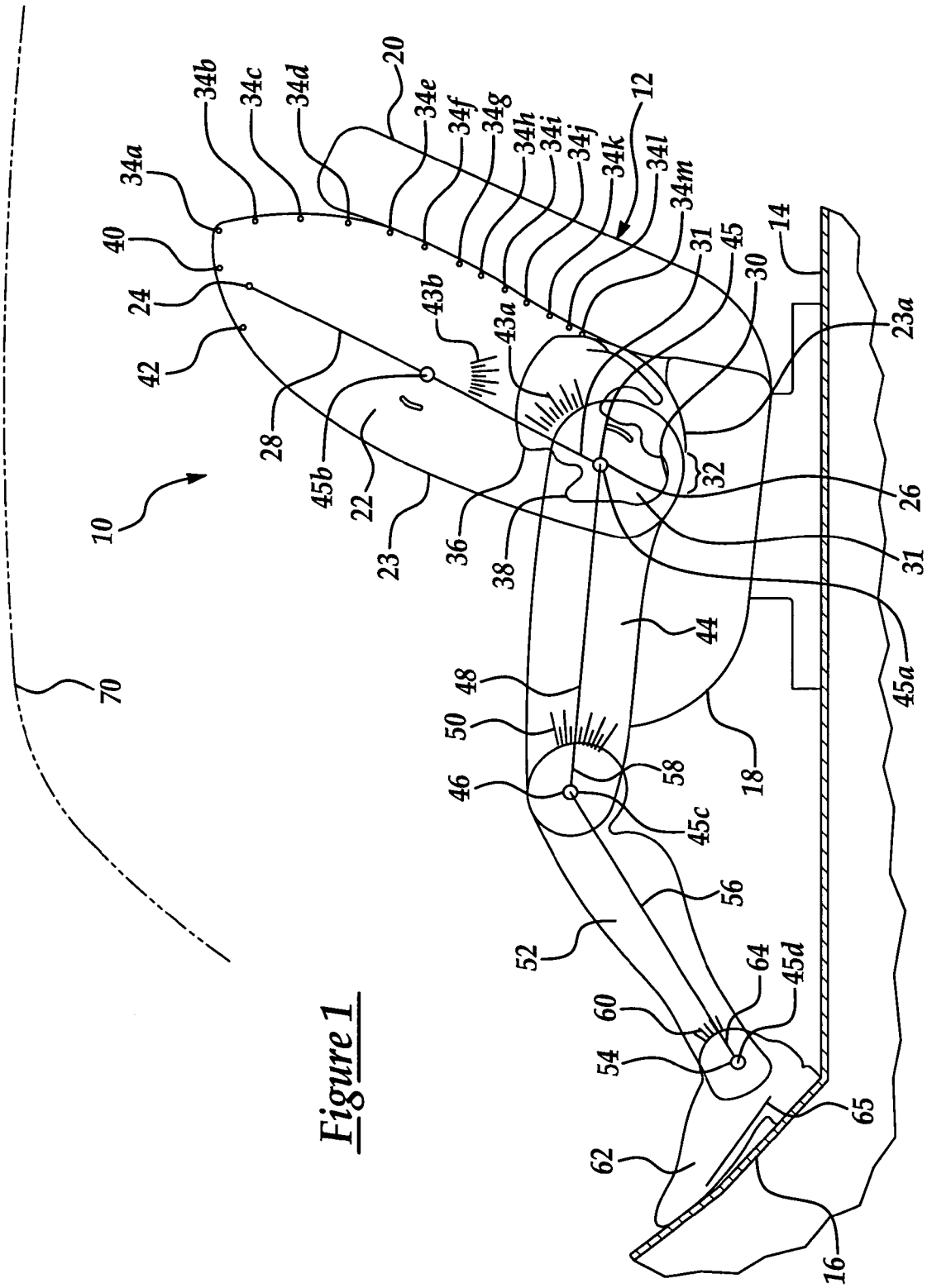
FIG. 1 is an elevational view of a design template, according to the present invention, illustrated in operational relationship with a seat and having a NEUTRAL posture torso section.

Referring to FIG. 1, one embodiment of a design template 10, according to the present invention, is illustrated in operational relationship with a seat, generally indicated at 12, of an automotive vehicle (not shown). The automotive vehicle includes a floor pan 14 which includes a toe pan or toe board 16 adjacent to a front end thereof. The seat 12 is mounted on the floor pan 14 by suitable adjustable mounting mechanisms (not shown). The seat 12 includes a seat cushion 18 to primarily support a torso weight under an ischium of a human body occupant and a weight of a thigh of the human body occupant and a seat back 20 to support a back of the human body occupant primarily in a thoracic and lumbar regions of the human body occupant. It should be appreciated that the design of the seat cushion 18 and seat back 20 will be in accordance with the design template 10 to resiliently and comfortably support the human body occupant when seated thereon.

The design template 10, according to the present invention, is used to design the seat 12. The design template 10 includes at least one torso section 22. The torso sections 22 are dimensionally accurate to simulate or represent body size of a human male who is $95^{th}$ percentile in weight and stature, a human male who is $50^{th}$ percentile in weight and stature or a human female who is $5^{th}$ percentile in weight and stature it should be appreciated that the $5^{th}$ percentile female represents the smallest body size while the $95^{th}$ percentile male represents the largest body size.

In general, the development of the design template 10 has relied upon the U.S. Public Health Service for height and weight description of the general population and the U.S. military for the anthropometric dimensions of the human body that are used in ergonomic design. Anthropometric surveys, however, measure people in standardized sitting and standing postures. Since the purpose of the design template 10 is to represent the human body in anatomically and biomechanically correct sitting postures, additional data had to be collected that would describe the sitting posture of the human body. Sitting posture is primarily a function of torso posture. As a result, an investigation was conducted of torso back shape in different sitting postures.

The results can be divided into two parts: 1) the size and shape of the torso sections 22 and 2) the size and shape of the leg sections (thigh sections 44, calf sections 52 and shoe sections 62 to be described). The human body was divided into three sizes: small female, average male and large male. The torso was divided into three shapes representing three postures: ERECT, NEUTRAL and SLUMPED. The human body sizes were defined by anthropometric dimensions and regression equations that describe the relationships between the dimensions. The torso shapes were mathematically defined from measurements of subjects in five positions.

In general, spinal, chest, pelvic and extremity landmarks in fifty females and fifty-two males were measured in five postures, ranging from full lumbar extension to fully slouched. Spine height was used to normalize the back curvatures for each subject so that variation in the shape of the back due to size differences was minimized. The data that measures lumbar curvature for each posture was represented by a second order polynomial that was fit to the lumbar spine data and the average lumbar curvatures for each subject in the region bounded by L1 and L5 was calculated. Subjects were used to define the three postures if they had back curvatures within mathematically prescribed limits that define ERECT (lumbar extension with a relative curvature greater than 0.6 radians per spine height), NEUTRAL (straight lumbar spine with a relative curvature between +0.6 and −0.6 radians per spine height) and SLUMPED (lumbar flexion with a relative curvature less than −0.6 radians per spine height).

In order to obtain an average spinal shape, data from subjects measured were weighted according to their sitting height so that the statistical distribution of measured subjects matched those from the military anthropometric survey. The spinal shapes of the statistically weighted data were then averaged. The average male ERECT postures were then scaled to match the military $50^{th}$ percentile and $95^{th}$ percentile cervical sitting height. The average female ERECT posture was scaled to match the military $5^{th}$ percentile cervical sitting height. The same scaling factors were applied to the NEUTRAL and SLUMPED spinal shapes.

The pelvis in both males and females is based upon the average pelvis from an FAA pelvic study by Reynolds in 1982. The $95^{th}$ percentile male pelvis is scaled up from the average male pelvis and the $5^{th}$ percentile female pelvis is scaled down from the average female pelvis. The position of the pelvis was measured in each posture described above. The three-dimensional coordinates that describe the average pelvis in the FAA skeletal data base are rotated to the same pelvic orientation as the pelvis position in the measured subjects. After orienting the pelvis, the size of the pelvis was scaled to equal the pelvis size of the subjects in the NEUTRAL posture as represented by the distance between the Ischial Tuberosity and S1. The resulting skeletal data are optimally matched for position and size in the measured laboratory subjects. The spine was attached at S1 after correcting for tissue thickness in the pelvis and back.

The leg sections were defined for each of the three human body sizes: large male, average male and small female. The definition came from anthropometric estimates of the distance between joint centers at the hip, knee and ankle, otherwise referred to as link lengths. The depth of the sections was estimated from anthropometric equations that defined the relationship between human body weight and human body depth. These dimensions were used to assemble the thigh and calf sections to look like human segments for each of the three human body sizes.

The foot is assumed to be covered by an average shoe size for each of the respective human body sizes. The small female shoe is a size six, the average and large male shoe sizes are ten and twelve, respectively. The location of the ankle joint relative to the shoe was estimated from measurements of live people. It should be appreciated that the above was used to generate the design template 10.

Figure 2:
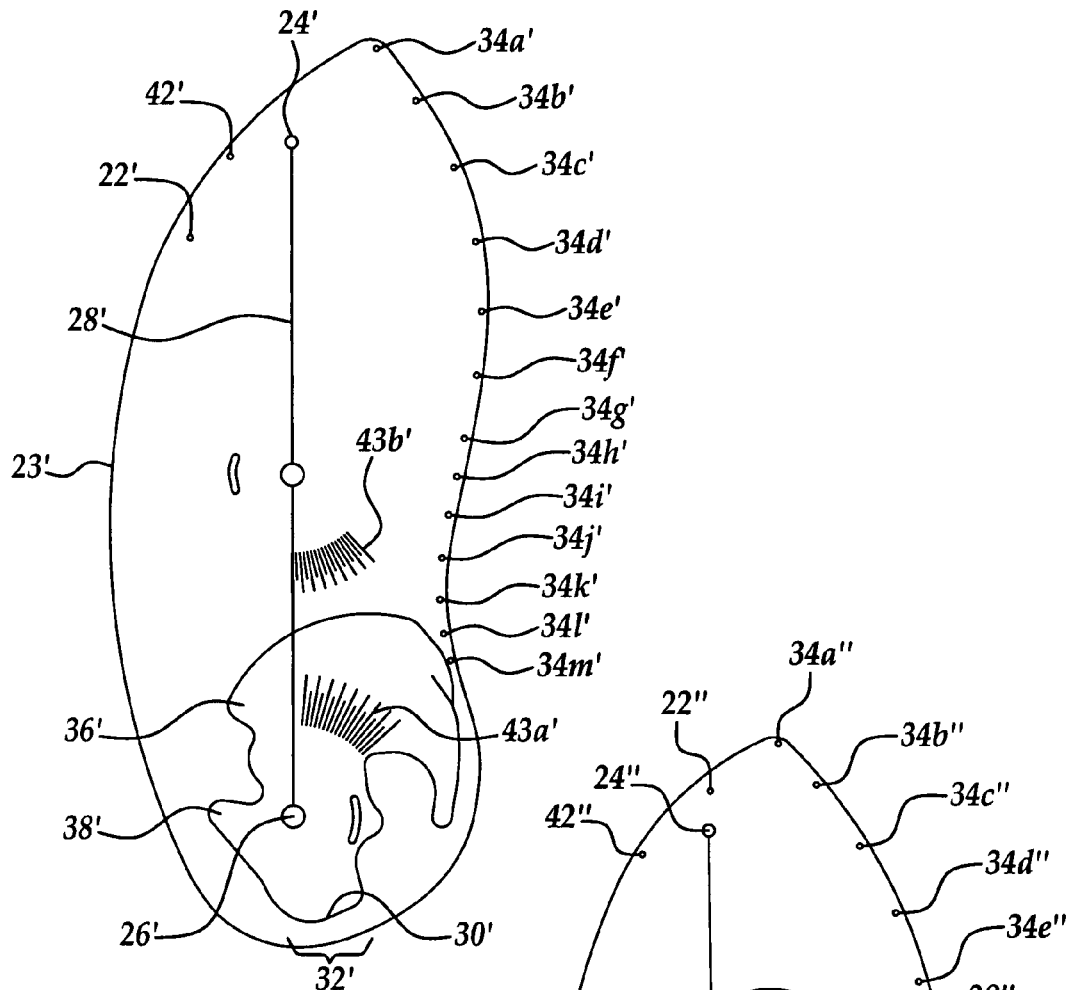
FIG. 2 is an elevational view of an ERECT posture torso section of the design template of FIG. 1.
Figure 3:
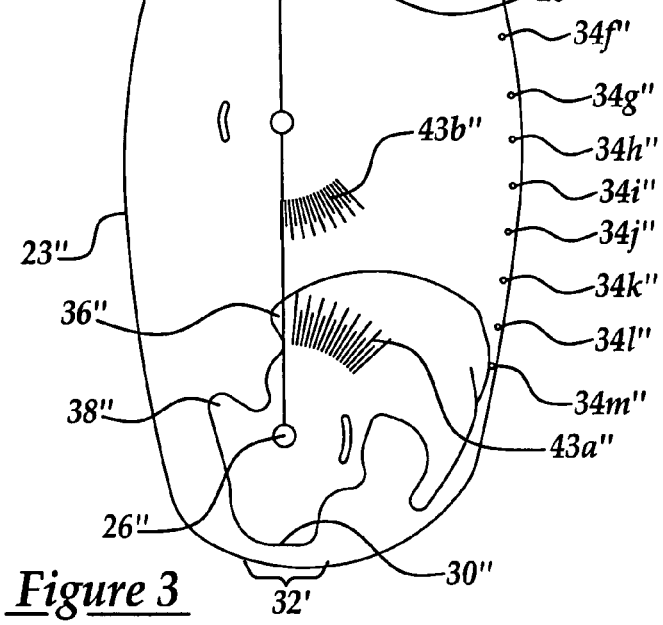
FIG. 3 is an elevational view of a SLUMPED posture torso section of the design template of FIG. 1.

As illustrated in FIG. 1, the torso section 22 is for a $50^{th}$ percentile male with a NEUTRAL posture. FIG. 2 illustrates a torso section 22 for a $50^{th}$ percentile male with an ERECT posture. FIG. 3 illustrates a torso section 22 for a $50^{th}$ percentile male with a SLUMPED posture. It should be appreciated that the torso section 22 can be for either the $95^{th}$ percentile male or $5^{th}$ percentile female with either one of a NEUTRAL, ERECT or SLUMPED posture. It is recommended that the seat design process begin with the NEUTRAL posture and proceed to accommodating the ERECT posture while the SLUMPED posture should be supported in every seat, but not encouraged.

The torso section 22 has an outer contour 23. The outer contour 23 has an interface portion 23a conforming to a deformed shape between the seat 12 and a seated human body occupant. The outer contour 23 also has an anterior portion 23b that is anthropometrically and anatomically correct.

The torso section 22 is made of any suitable media to represent the torso of a human body occupant. For example, the media may be electronic, paper, wood, plastic or the like. Preferably, the torso section 22 is a sheet of rigid material such as plastic. The torso section 22 is preferably transparent.

Figure 4:
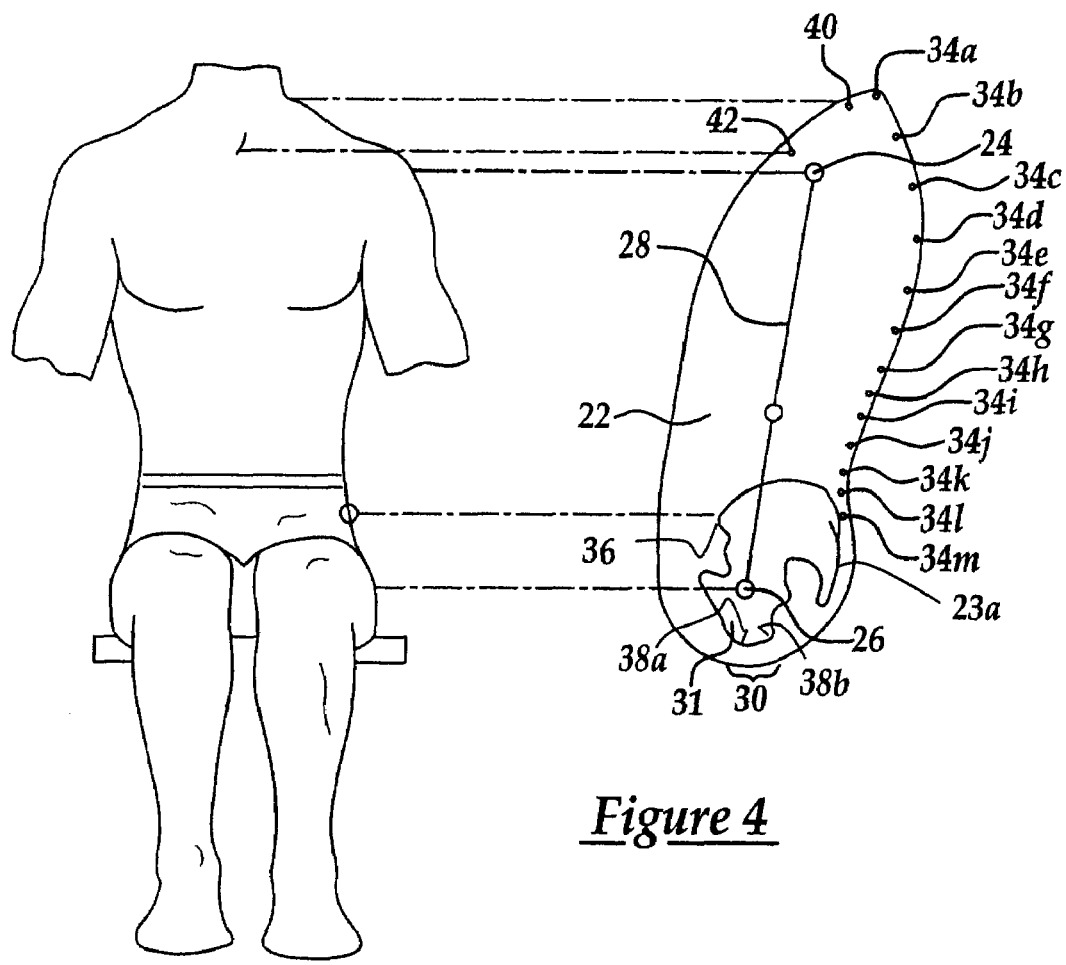
FIG. 4 is an elevational view of the design template of FIG. 1 relative to a front of a human body occupant.
Figure 5:
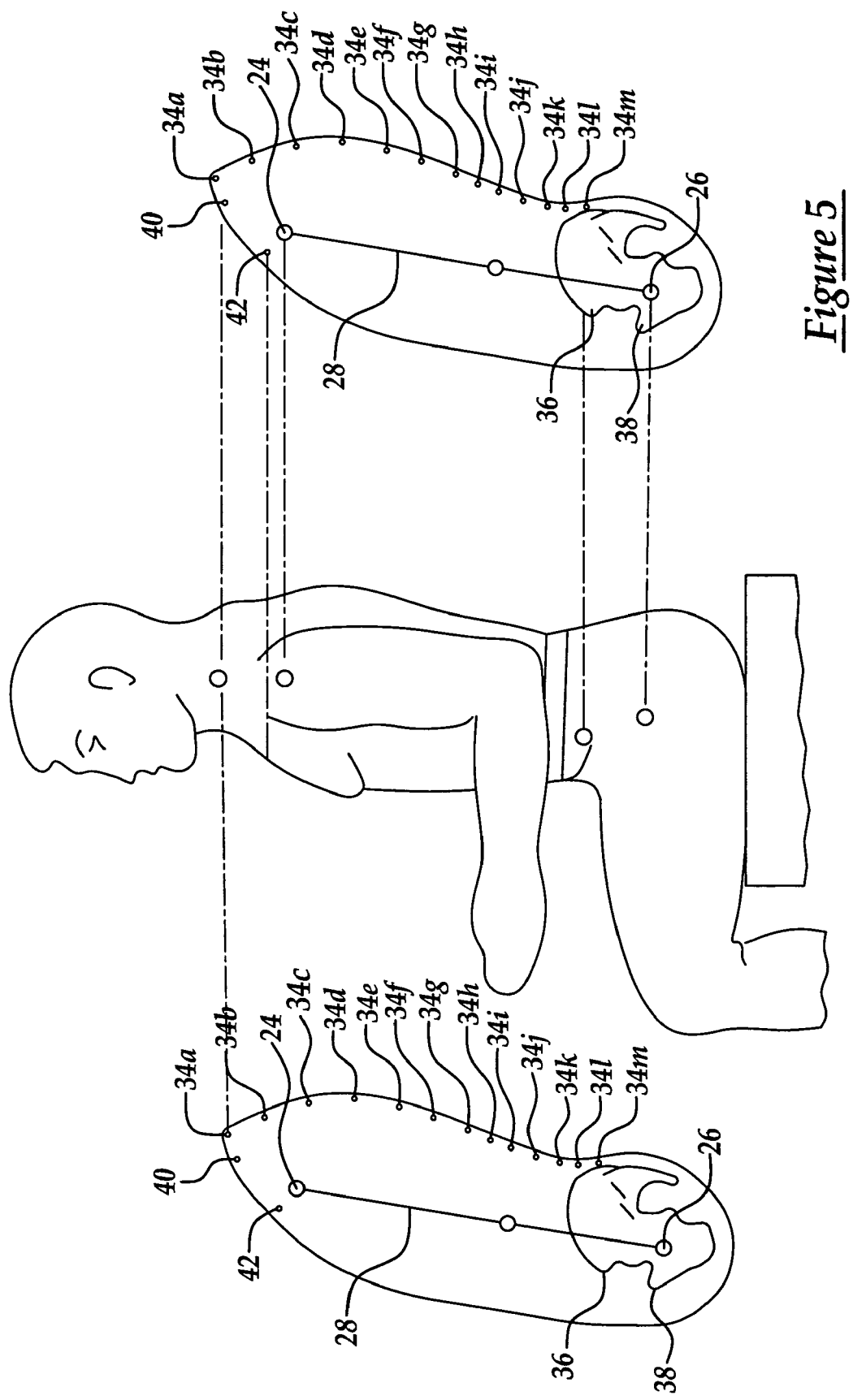
FIG. 5 is an elevational view of the design template of FIG. 1 relative to a side of a human body occupant.
Figure 7:
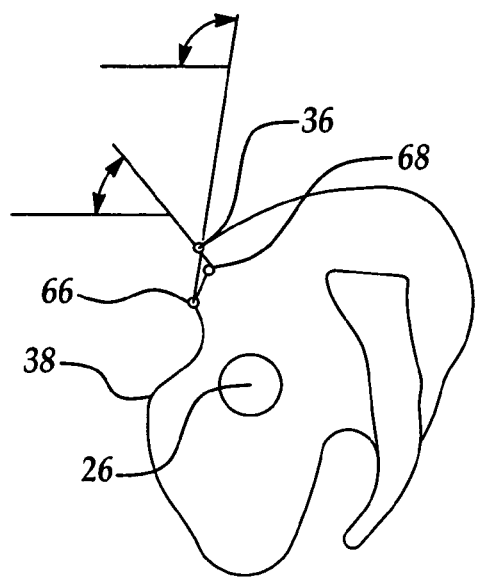
FIG. 7 is an elevational view of a pelvis illustrating angle of pelvic landmarks with respect to lap belt contact points.
Figure 8:
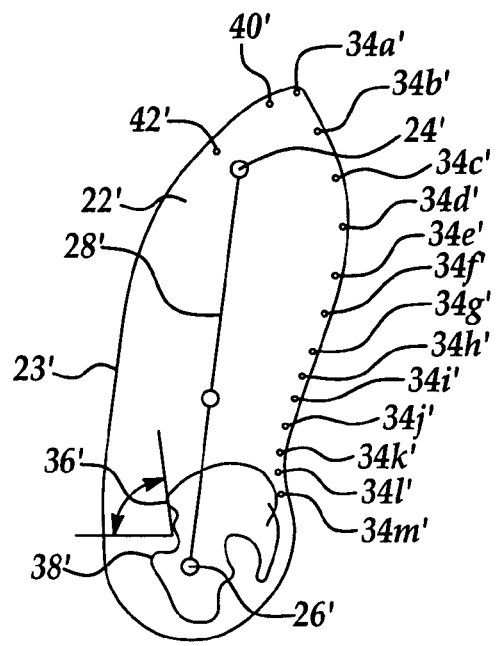
FIG. 8 is an elevational view of the design template of FIG. 1 with an ERECT posture illustrating angle of pelvic landmarks with respect to lap belt contact points.
Figure 9:
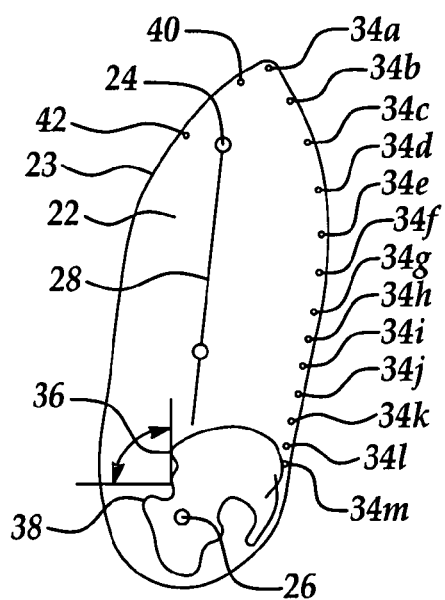
FIG. 9 is a view similar to FIG. 8 illustrating a NEUTRAL posture.
Figure 10:
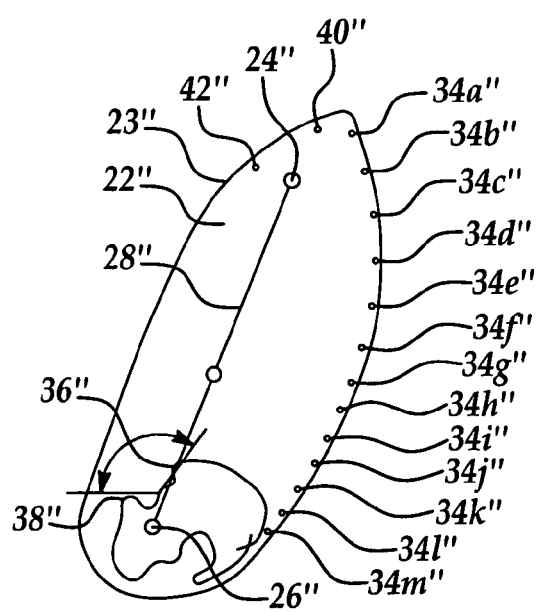
FIG. 10 is a view similar to FIG. 8 illustrating a SLUMPED posture.
Figure 11:
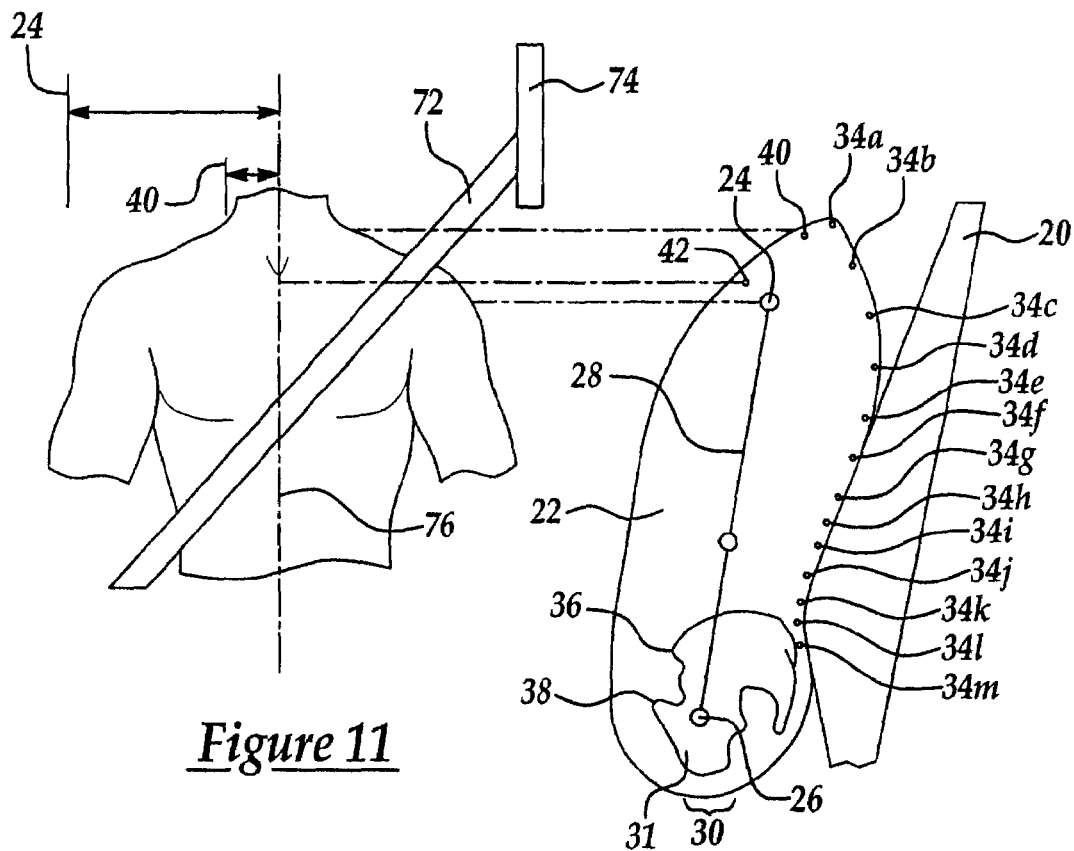
FIG. 11 is an elevational view of the design template of FIG. 1 illustrating shoulder belt positions relative to design template landmarks.

Referring to FIGS. 4 through 5, the torso section 22 includes anatomical details located relative to each other and the interface contour 23a is located relative to the anatomical details. The torso section 22 contains indicia of skeletal landmarks relative to a seated human body occupant. For example, the torso section 22 includes a shoulder joint 24 and a hip joint 26 and a line axis 28 connected therebetween. The torso section 22 includes a centerline projection of a pelvis with indicia representing an ischial tuberosity 38a, 38b, anterior superior iliac spine 36, pelvic or pubic symphysis 38 and sacrum 34m. The torso section 22 also has a point, $I_D°$, 30 (FIG. 12) as the lowest point on a ischial tuberosity 31 projected to the interface contour 23a of the occupied seat. Since the majority of torso weight passes through $I_D°30$, the area of the seat 12 below this point will have the highest pressure as well as the most deflection. The torso section 22 also has spinal landmarks 34 marked along the entire length of the back thereof. The spinal landmarks 34 are important for correctly placing the lumbar support and for adequate design of the chest support for the seat 12. The spinal landmarks 34 are for the neck (cervical spine) indicating C7 at 34a, chest (thoracic spine) indicating T2, T4, T6, T8, T10, T12 at 34b, 34c, 34d, 34e, 34f and 34g, respectively, referred to as point S (FIG. 12), low back (lumbar spine) indicating L1 through L5 at 34h, 34i, 34j, 34k and 34l, respectively, referred to as point L (FIG. 12), and sacrum (attaches the spine to the pelvis) indicating S1 at 34m. It should be appreciated that the hip joint 26 is referred to as the H-point in SAE seat design practice. The hip joint is a ball-and-socket joint connecting the thigh to the pelvis of a human body occupant. It should also be appreciated that the anterior shape of the torso section 22 is anthropometrically and anatomically correct. It should further be appreciated that the location of the hip joint changes with posture.

The torso section 22 has indicia for the most anterior portion on the top of a pelvis of a human body occupant which is the anterior superior iliac spine (ASIS), point A 36 and a pubic symphysis, point P 38. A lap belt to be described should cross below point A 36 and above point P 38. The torso section 22 also has indicia for the shoulder joint 24, neck/shoulder junction, point N 40 and a suprasternal (top of sternum), point SS 42. The shoulder strap should be below point N 40 and above shoulder joint 24.

The torso section 22 includes a first angular scale 43a for hip angle and a second angular scale 43b for torso angle. A torso bar is connected to the torso section 22 on the hip joint 26 to shoulder joint axis 28, 205 mm from the hip joint 26 for all torso sections 22. The torso bar is connected to the torso section 22 by a hinge such as a hollow bolt and nut 45b. It should be appreciated that the angle on the second angular scale 43b indicates the angle between line axis 28 and vertical as defined by parallel indicia lines on the torso bar. Furthermore, it should be appreciated that the first angular scale 43a has a range of 45° to 180° with a comfort range of 85° to 125°. It should be appreciated that the second angular scale 43b has a range of –20° to 45° with a comfort range of 10° to 30°.

The design template 10 also includes at least one thigh section 44. The thigh sections 44 are dimensionally accurate to simulate or represent human body size of the $95^{th}$ percentile male, $50^{th}$ percentile male and $5^{th}$ percentile female. The thigh section 44 is made of any suitable media to represent the thigh of a human body occupant. For example, the media may be electronic, paper, wood, plastic or the like. Preferably, the thigh section 44 is a sheet of rigid material such as plastic. The thigh section 44 is preferably transparent.

The thigh section 44 is connected to the torso section 22 at the hip joint 26 by a hinge such as a hollow bolt and nut 45a. The thigh section 44 includes indicia of the hip joint 26 and a knee joint 46 and a line axis 48 therebetween. The thigh section 44 also includes an angular scale 50 for knee angle and a pointer 51 for hip angle. It should be appreciated that the angular scale 50 for the knee angle has a range of 45° to 180° with a comfort range of 110° to 140°. It should also be appreciated that the pointer 51 indicates the angle on the first angular scale 43a for the angle between the line axis 48 and line axis 28.

The thigh section 44 has a deformed bottom contour 51a representing a change from hard bone tissue to soft muscle tissue in contact with the seat cushion 18. The thigh section 44 and torso section 22 are geometrically congruent in a seated posture where they overlap on the seat cushion 18.

The design template 10 also includes at least one calf section 52. The calf sections 52 are dimensionally accurate to simulate or represent human body size of the $95^{th}$ percentile male, $50^{th}$ percentile male and $5^{th}$ percentile female. The calf section 52 is made of any suitable media to represent the calf of a human body occupant. For example, the media may be electronic, paper, wood, plastic or the like. Preferably, the calf section 52 is a sheet of rigid material such as plastic. The calf section 52 is preferably transparent.

The calf section 52 is connected to the thigh section 44 at the knee joint 46 by a hinge such as a hollow bolt and nut 45c. The calf section 52 includes indicia of the knee joint 46 and an ankle joint 54 and a line axis 56 therebetween. The calf section 52 also includes indicia of a pointer 58 for knee angle and an angular scale 60 for ankle angle. The calf section 52 and thigh section 44 are geometrically congruent in a seated posture where they overlap on anterior and superior contours. It should be appreciated that the angular scale 60 for the ankle angle has a range of 70° to 160° with a comfort range of 85° to 115°. It should also be appreciated that the pointer 58 indicates the angle on the angular scale 50 for the angle of the knee between the line axis 48 and line axis 56.

The design template 10 further includes at least one shoe section 62. The shoe sections 62 are dimensionally accurate to simulate or represent human shoe size of the $95^{th}$ percentile male, $50^{th}$ percentile male and $5^{th}$ percentile female. The shoe section 62 is made of any suitable media to represent the shoe. For example, the media may be electronic, paper, wood, plastic or the like. Preferably, the shoe section 62 is a sheet of plastic material. The shoe section 62 is preferably transparent.

The shoe section 62 is connected to the calf section 52 at the ankle joint 54 by a hinge such as a hollow bolt and nut 45d. The shoe section 62 includes indicia for the ankle joint 54, a pointer 64 for the ankle angle and a line axis 65 from a ball of foot to heel of foot inside a shoe. It should be appreciated that the shoe section 62 has a heel. It should also be appreciated that the pointer 64 indicates the angle on the angular scale 60 for the angle of the ankle between the line axis 65 and line axis 56.

Referring to FIGS. 7 through 11, the torso section 22 contains indicia on the location of landmarks that define the optimal path of a lap belt and a shoulder belt of an occupant restraint system. It should be appreciated that this information is important for lap belt and shoulder belt attachment points relative to differences in the position of the seat 12 and human body occupant size.

The torso section 22 also has the indicia of the anterior superior iliac spine (ASIS) 66. The torso section 22 further has the indicia of an ASIS notch 68. It should be appreciated that the lap belt should lie below the ASIS 36 of the human body occupant to reduce chances for "submarining" (occupant sliding under the lap belt) in the event of a vehicle collision.

Accordingly, an occupant restraint system, according to the present invention, includes a lap belt anchored to vehicle structure such that it extends below the ASIS 36 and above the AIIS 66 for the design template 10 with the torso section 22 having the ERECT posture. The occupant restraint system includes a shoulder belt 72 anchored to vehicle structure 74 such that it extends a first predetermined distance from a centerline 76 of the seat 12 to the shoulder joint 24 for the design template 10 with the torso section 22 being either the $5^{th}$ percentile female, $95^{th}$ percentile male or a $50^{th}$ percentile male and a second predetermined distance from the centerline of the seat 12 to the neck/shoulder junction 40 for the design template 10 with the torso section 22 being either the $5^{th}$ percentile female, $50^{th}$ percentile male or the $95^{th}$ percentile male. The first predetermined distance and second predetermined distance are in the following table:

TABLE 1

Location of shoulder belt for design templates.

| Design Template 10 | First Predetermined Distance from Centerline to Shoulder[1] (mm) | Second Predetermined Distance from Centerline to base of neck[2] (mm) |
|---|---|---|
| $5^{th}$ Percentile Female | 190 | 51 |
| $50^{th}$ Percentile Male | 246 | 65 |
| $95^{th}$ Percentile Male | 267 | 71 |

[1]Half bideltoid distance.
[2]Radius of the circumference at the base of neck.

Use of Templates in Vehicle Packaging

A method, according to the present invention, is disclosed of establishing occupant accommodation criteria in a vehicle package based on a predetermined class of vehicles. The method includes providing the design template 10 having the torso section 22 being either the $95^{th}$ percentile male, $50^{th}$ percentile male or $5^{th}$ percentile female with either the ERECT posture, NEUTRAL posture or SLUMPED posture and a corresponding percentile leg section made up of the thigh section 44, calf section 52 and shoe section 62. Within a human body size, the leg sections are the same for all three postures, only the curvature of the spinal column in the centerline differs. The method includes defining an accelerator to provide a heel point of the shoe section 62. The method includes defining deflection of a seat 12 whether it is high deflection (soft), medium deflection (medium) or low deflection (hard). The method also includes positioning the design template 10 in the vehicle such that the heel of the shoe section 62 is at the heel point, the bottom of the thigh section 44 under the hip joint 26 is at the seat height, the torso section 22 is at the torso angle 43b and angles of the leg section are within predetermined conform ranges. The method includes establishing a seat height from a floor to a bottom of the torso section 22 at $I_D°$. The method further includes establishing an H-point (Hpt) for each design template 10 and H-point reference point (HptRP) relative to the heel point in a vehicle axis system by the design template 10.

Location of H-Point and Seat Travel

The H-point represents the two-dimensional center of rotation of the hip joint 26 and is located at the center of the hollow nut and bolt 45a. The H-point window in a vehicle package is defined by a polygon that contains the locations of the $5^{th}$ percentile female, $50^{th}$ percentile male and $95^{th}$ percentile male H-points for the range of comfort angles (Table 2) in the ankle, knee and hip joints per vehicle package requirements. The package requirements define an occupant space between the vehicle floorpan 14 and a vehicle headliner 70 that determines in large part the space available for the seat 12 and the human body occupant. As the space available for the seat 12 and human body occupant diminish, the mechanical properties of the seat 12 and its geometrical shape and size become more critical in supporting the variety of postures (Table 3) represented by the design template 10 for the seat design process.

1. The method includes the step of adjusting joint angles at an ankle, knee and hip of the design template 10 to lie within a predetermined range. For example, adjust linkage joint angles between ankle, knee and hip of the design template 10 to lie within predetermined comfort ranges at each joint. Joint angles are laid out on the design template 10 at the hip, knee and ankle joints. The design template angles for comfort are defined for the torso, thigh and each of the leg joints within the following ranges (Table 2).

TABLE 2

Comfort Joint Angles

| Dimension | Definition | Design Template 10 |
|---|---|---|
| Torso | Vertical = 0° | 10° to 30° |
| Thigh | 90° - (Hip-Torso) | 5° to 10° |
| Hip | Included Angle | 85° to 125° |
| Knee | Included Angle | 110° to 140° |
| Ankle | Included Angle | 85° to 115° |

2. The method includes the step of reclining the torso section 22 a predetermined angle from vertical. The torso angle for the seat back 20 is defined with vertical at zero. For example, recline the torso section 22 from vertical according to the design template 10 posture as follows (Table 3):

TABLE 3

Torso back angles for the design templates per posture group.

| Posture | Recommended Angle | Angle Range |
|---|---|---|
| ERECT | 10° | 8°-14° |
| NEUTRAL | 18° | 14°-22° |
| SLUMPED | 26° | 20°-28° |

Horizontal Seat Travel

The x displacement (i.e., fore-aft direction) is defined by the location of H-points in the vehicle x direction from the $5^{th}$ percentile female to the $95^{th}$ percentile male. Ankle angle, accelerator pedal orientation, and length of the leg are the most important parameters in this packaging dimension. Comfort angles (Table 2) at the knee vary according to seat height packaging. As the seat height (i.e., SE H61) space rises, the comfort angle of the knee used to define x-displacement of the seat 12 decreases. As the seat height space decreases, the comfort angle of the knee used to define x-displacement of the seat 12 increases. If comfort angle of the ankle remains in the 85° to 90° range and the thigh angle with horizontal remains in the 5° to 10° range, the horizontal seat travel is large and well-defined.

Vertical Seat Travel

The z displacement (i.e., vertical direction) is defined by the location of H-points in the vehicle z direction from the $95^{th}$ percentile male to the $5^{th}$ percentile female. Posture varies according to packaging volume and occupant preference, but in general, the method includes locating an eye relative to a shoulder joint such that seat travel accommodates eye location (Table 4) for all human body occupants in all postures. As the seat height (i.e., SE H61) space decreases, a SLUMPED posture becomes more likely in the human body occupant. As the seat height space increases, an ERECT posture becomes more likely in the human body occupant. The vision needs of different size human body occupants and the amount of headroom in the vehicle package largely determine seat travel in this direction.

TABLE 4

Location of Eye relative to shoulder joint in design template 10.

| Design Template 10 | Horizontal (X) mm (Forward) | Vertical (Z) mm (Above) |
|---|---|---|
| $5^{th}$ Percentile Female | 52 | 186 |
| $50^{th}$ Percentile Male | 63 | 205 |
| $95^{th}$ Percentile Male | 69 | 212 |

Heel Location and Computation of H-Point Comfort Angles in the Leg

The location of the heel is determined by ankle angle and accelerator-foot axis orientation. The prescribed ankle angle lies between 85° and 90° with the shoe section 62 positioned so that the foot axis 65 is parallel to the undepressed accelerator (0 mph) pedal.

1. A method for establishing occupant accommodation in a vehicle package, according to the present invention, is disclosed. In general, the method includes the steps of selecting in a logical sequence at least one design template 10 having a torso section 22 being one of a $95^{th}$ percentile male, $50^{th}$ percentile male, and a $5^{th}$ percentile female having either an ERECT posture, a NEUTRAL posture, or SLUMPED posture and having a leg section. The leg section is made up of the thigh section 44, calf section 52 and shoe section 62. The method also includes the step of marking the location of heel point and H-point.

2. The method includes the step of positioning the heel of the shoe section 62 on the floorpan 14 with the foot axis 65 of the shoe section 62 parallel to the undepressed (0 mph) accelerator pedal axis. Forcing the foot axis to remain parallel to the accelerator pedal may place the knee and hip joints outside their range of seating comfort. However, adjusting the foot axis so that the angle is 10° from the accelerator pedal line provides for a wider range of positions while maintaining joint angles within their comfort range. This adjustment is best because it represents the compensational change in ankle angle brought about by leg splay and calf rotation in the actual vehicle package.

3. The method includes the step of locating the center of the hip joint 26 to define the H-point for the $95^{th}$ percentile male ($Hpt^{95}$). Since the design template 10 represents the human body occupant in a seat, the vertical and horizontal location of $Hpt^{95}$ is defined in an occupied seat of a vehicle package based on a predetermined class of vehicles for the design template 10 of the $95^{th}$ percentile male. The horizontal location of $Hpt^{95}$ in the vehicle package is defined by the position of the heel on the floorpan 14 and the comfort angles (Table 2) of the ankle, knee, and thigh that control the relative orientations of the shoe section 62, calf section 52 and thigh section 44 of the design template 10 of the $95^{th}$ percentile male. The vertical location of $Hpt^{95}$ is defined by the height from the floorpan 14 to center of the circle defined by the hollow bolt and nut 45a of the design template 10 of the $95^{th}$ percentile male. Since the forces on the occupied seat under H-point at $I_D^o$ are determined by torso size and torso angle, the vertical space in the centerline of the seat available for supporting seat structures is defined by the vertical height of the interface portion 23a of the outer contour of the design template 10 from the floorpan 14. Torso angle is selected to accommodate eye vision and head clearance of the $95^{th}$ percentile male in the vehicle package based on the height available in a predetermined class of vehicles from the floorpan 14 to the headliner 70. After optimally positioning the design template 10 of the $95^{th}$ percentile male, trace the center circle of the hollow bolt and nut 45a to define the $Hpt^{95}$ that is the center of the circle of the design template 10 of the $95^{th}$ percentile male having one of the ERECT posture, NEUTRAL posture or SLUMPED posture. Record the posture selected for defining $Hpt^{95}$.

4. The method includes the step of positioning the heel of the shoe section 62 for the design template 10 of the $5^{th}$ percentile female having one of the ERECT posture, NEUTRAL posture or SLUMPED posture in the vehicle package. Since the design template 10 represents the human body occupant in a seat, the vertical and horizontal location of the H-point for the $5^{th}$ percentile female ($Hpt^5$) is defined in an occupied seat of a vehicle package based on a predetermined class of vehicles for the design template 10 of the $5^{th}$ percentile female. The horizontal location of $Hpt^5$ in the vehicle package is defined by the position of the heel on the floorpan 14 and the comfort angles (Table 2) of the ankle, knee, and thigh that control the relative orientations of the shoe section 62, calf section 52 and thigh section 44 of the design template 10 of the $5^{th}$ percentile female. The vertical location of $Hpt^5$ is defined by the height from the floorpan 14 to center of the circle defined by the hollow bolt and nut 45a of the design template 10 of the $5^{th}$ percentile female. Since the forces on the occupied seat under H-point at $I_D^o$ are determined by torso size and torso angle, the vertical space in the centerline of the seat available for supporting seat structures is defined by the vertical height of the interface portion 23a of the outer contour of the design template 10 from the floorpan 14. Torso angle is selected to accommodate eye vision and head clearance of the $5^{th}$ percentile female in the vehicle package based on the height available in a predetermined class of vehicles from the floorpan 14 to the headliner 70. After optimally positioning the design template 10 of the $5^{th}$ percentile female, trace the center circle of the hollow bolt and nut 45a to define the $Hpt^5$ that is the center of the circle of the design template 10 of the $5^{th}$ percentile female having one of the ERECT posture, NEUTRAL posture or SLUMPED posture. Record the posture selected for defining $Hpt^5$.

5. The method includes the step of positioning the heel of the shoe section 62 for the design template 10 of the $50^{th}$ percentile male having one of the ERECT posture, NEUTRAL posture or SLUMPED posture in the vehicle package. Since the design template 10 represents the human body occupant in a seat, the vertical and horizontal location of the H-point for the 50$^{th}$ percentile male (Hpt$^{50}$) is defined in an occupied seat of a vehicle package based on a predetermined class of vehicles for the design template 10 of the 50$^{th}$ percentile male. The horizontal location of Hpt$^{50}$ in the vehicle package is defined by the position of the heel on the floorpan 14 and the comfort angles (Table 2) of the ankle, knee, and thigh that control the relative orientations of the shoe section 62, calf section 52 and thigh section 44 of the design template 10 of the 50$^{th}$ percentile male. The vertical location of Hpt$^{50}$ is defined by the height from the floorpan 14 to center of the circle defined by the hollow bolt and nut 45a of the design template 10 of the 50$^{th}$ percentile male. Since the forces on the occupied seat under H-point at $I_D°$ are determined by torso size and torso angle, the vertical space in the centerline of the seat available for supporting seat structures is defined by the vertical height of the interface portion 23a of the outer contour of the design template 10 from the floorpan 14. Torso angle is selected to accommodate eye vision and head clearance of the 50$^{th}$ percentile male in the vehicle package based on the height available in a predetermined class of vehicles from the floorpan 14 to the headliner 70. After optimally positioning the design template 10 of the 50$^{th}$ percentile male, trace the center circle of the hollow bolt and nut 45a to define the Hpt$^{50}$ that is the center of the circle of the design template 10 of the 50$^{th}$ percentile male having one of the ERECT posture, NEUTRAL posture or SLUMPED posture. Record the posture selected for defining Hpt$^{50}$.

6. The method includes the step of constructing a line parallel to a travel axis of a seat track in the vehicle package. After considering seat deflection for each of the above design templates 10, construct a line that best fits the location of each H-point for the design template 10 of the 5$^{th}$ percentile female, 50$^{th}$ percentile male and 95$^{th}$ percentile male.

7. A method to define a H-point Reference Point (HptRP) that is at the rearmost and downmost position of the seat 12 in the vehicle package is disclosed. Hpt$^{95}$ and HptRP may be coincidental. After optimally defining the travel axis of the seat track, the line parallel to the travel axis of the seat track may be extended rearward to accommodate a larger human occupant. The direction that the track is extended depends upon the type of seat, whether manual or power adjustments are used, and the position and orientation of the seat track that accommodates the 5$^{th}$ percentile female and 50$^{th}$ percentile male.

Seat Design

A method for designing a seat, according to the present invention, is disclosed. In general, the method includes the steps of selecting at least one design template 10 having a torso section 22 being one of the 95$^{th}$ percentile male, 50$^{th}$ percentile male and 5$^{th}$ percentile female having either the ERECT posture, NEUTRAL posture or SLUMPED posture and having a leg section. The leg section is made up of the thigh section 44, calf section 52 and shoe section 62. The method also includes the step of forming load supporting contours and unloaded contours of the seat 12 for at least one design template 10. The forces acting on the occupied (°) seat 12 are distributed into load support points in each design template 10 that are used to define the thorax (S°), lumbar (L°), ischium ($I_D°$) and thigh (T°) load support points (FIG. 12) in the seat 12.

For example, select the design template 10 of the 95$^{th}$ percentile male having the NEUTRAL posture with the leg section attached. After using the NEUTRAL posture, proceed to accommodating the ERECT posture. The SLUMPED posture should be supported in every seat 12, but not encouraged by any poor design effects in the seat 12.

The orientation of the pelvis changes with each of the three postures. In the ERECT posture, the pelvis is rotated forward so that the D-point is closer to the most anterior point on the ischium (I1). In the SLUMPED posture, the pelvis is rotated rearward so that D-point is closer to the most posterior point on the ischium (I2). Thus, as the orientation of the pelvis changes with posture, critical design landmarks, i.e., D-point, change their location.

In the ERECT posture, the position of the tip of the sacrum is above the occupied seat contour so that the contour from bite line to D-point is not contacted. In the SLUMPED posture, the position of the tip of the sacrum is close to the occupied seat contour so that the seat 12 from D-point to bite line should not rise, but slope downward to reduce pressure on the sacrum.

1. The method includes the step of tracing the interface contour 23a of the design template 10 of the 95$^{th}$ percentile male having the NEUTRAL posture. After optimally adjusting the template heel point, H-point and comfort angles (Tables 1 and 2), trace the interface contour 23a, marking all landmarks.

2. The method also includes the step of estimating a first point on the occupied seat interface contour at S° on the design template 10 under occupant load. For example, in the 95$^{th}$ percentile male having the ERECT posture, mark S° (FIG. 12) at T6 (34d) by constructing the shortest line between the center of the vertebral hole and the interface contour 23a line. Mark the intersection of the two lines to represent the thorax load support point S°.

3. The method also includes the step of estimating a second point on the unoccupied seat interface contour at $S^U$. For example, estimate the deflection at S° by using the appropriate value from FIGS. 13 through 16. The displacement of S° to $S^U$ is normal to the tangent at the T6 back contour point in the 95$^{th}$ percentile male having the NEUTRAL posture.

4. The method also includes the step of estimating a first point on the occupied seat interface contour at L° on the design template 10 under occupant load. For example, in the 95$^{th}$ percentile male having the ERECT posture mark L° (FIG. 12) at L3 (34j) by constructing the shortest line between the center of the vertebral hole and the interface contour 23a line. Mark the intersection of the two lines to represent the lumbar load support point L°.

5. The method also includes the step of estimating a second point on the unoccupied seat interface contour at $L^U$. For example, by using the appropriate value from FIGS. 13 through 15, estimate the deflection at L°. The displacement of L° to $L^U$ is normal to the tangent at the L3 back contour point. In the ERECT posture for a seat back without an adjustable lumbar support, $L^U$ should contact but not deflect the seat back 20. In the NEUTRAL posture, $L^U$ should be deflected in the seat back 20. In the SLUMPED posture, the design template 10 should not make contact with the seat back 20 at $L^U$.

6. The method includes the step of estimating a first point on the occupied seat interface contour at $I_D°$ on the design template 10 under occupant load. The $I_D^o$ is the lowest tangential point under the ischium projected onto the interface contour 23a.

7. The method includes the step of estimating a second point on the unoccupied seat interface contour at $I_D^U$. For example, estimate the undeflected $I_D^U$ by adding the appropriate value (e.g., FIGS. 14 through 16 for the NEUTRAL posture) to the vertical dimension of the deflected $I_D^o$.

Figure 12:
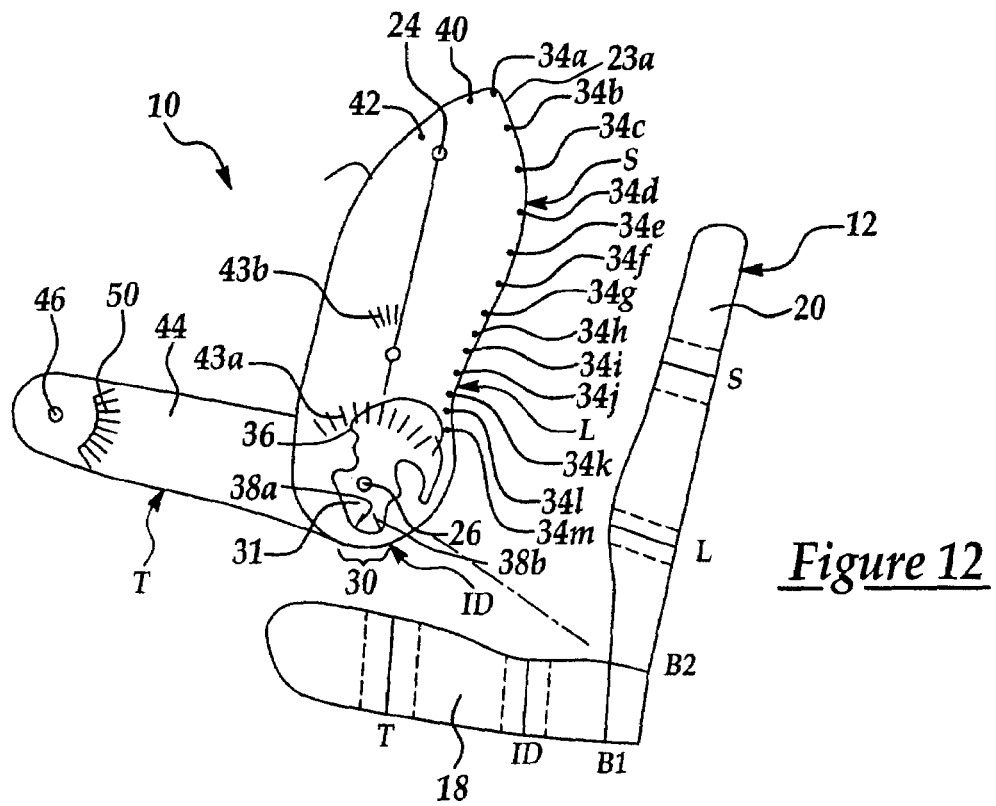
FIG. 12 is an elevational view of the design template of FIG. 1 and a cross-section of a seat.
Figure 13:
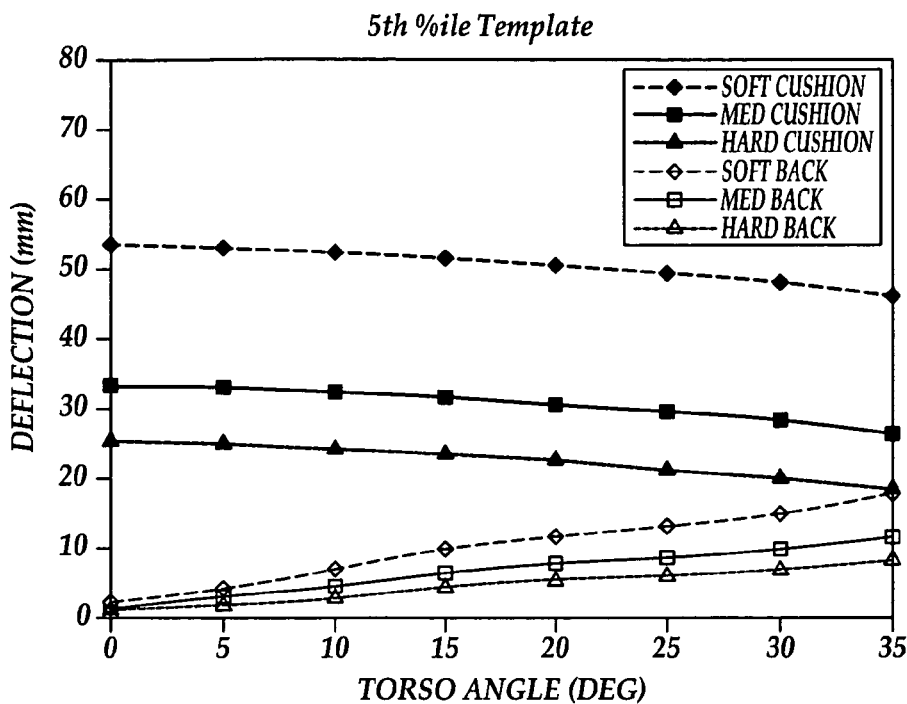
FIG. 13 is a graph that is representative of seat cushion and seat back deformation for $5^{th}$ percentile female having a NEUTRAL posture.
Figure 14:
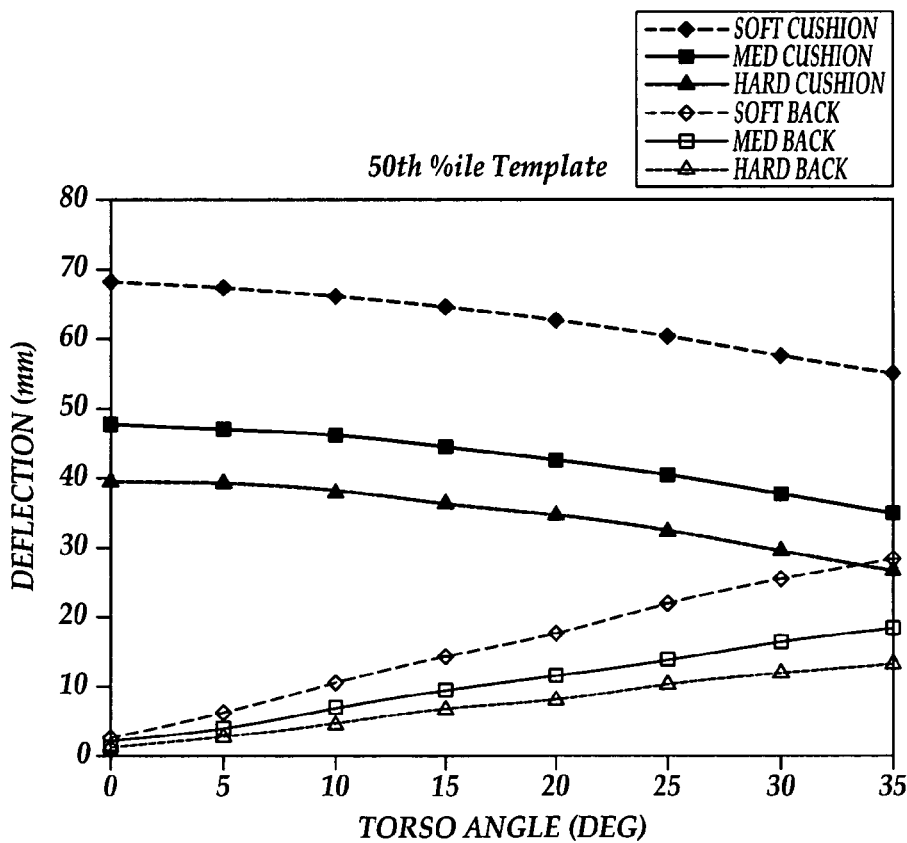
FIG. 14 is a graph that is representative of seat cushion and seat back deformation for $50^{th}$ percentile male having a NEUTRAL posture.
Figure 15:
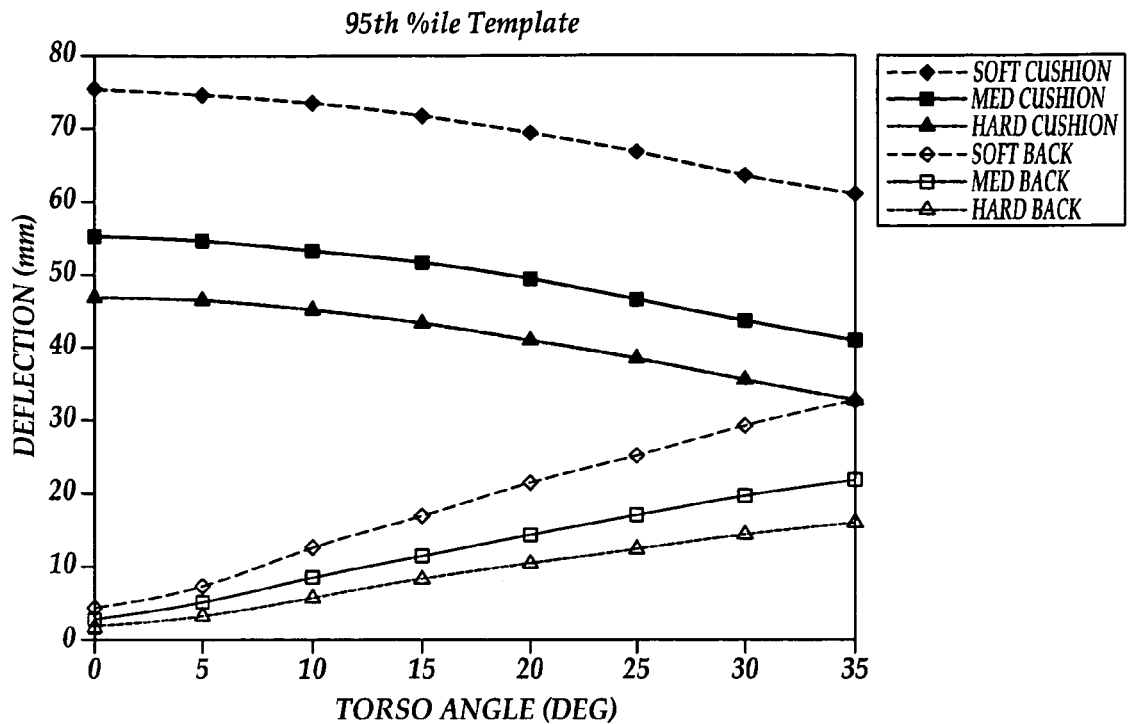
FIG. 15 is a graph that is representative of seat cushion and seat back deformation for $95^{th}$ percentile male having a NEUTRAL posture.
Figure 16:
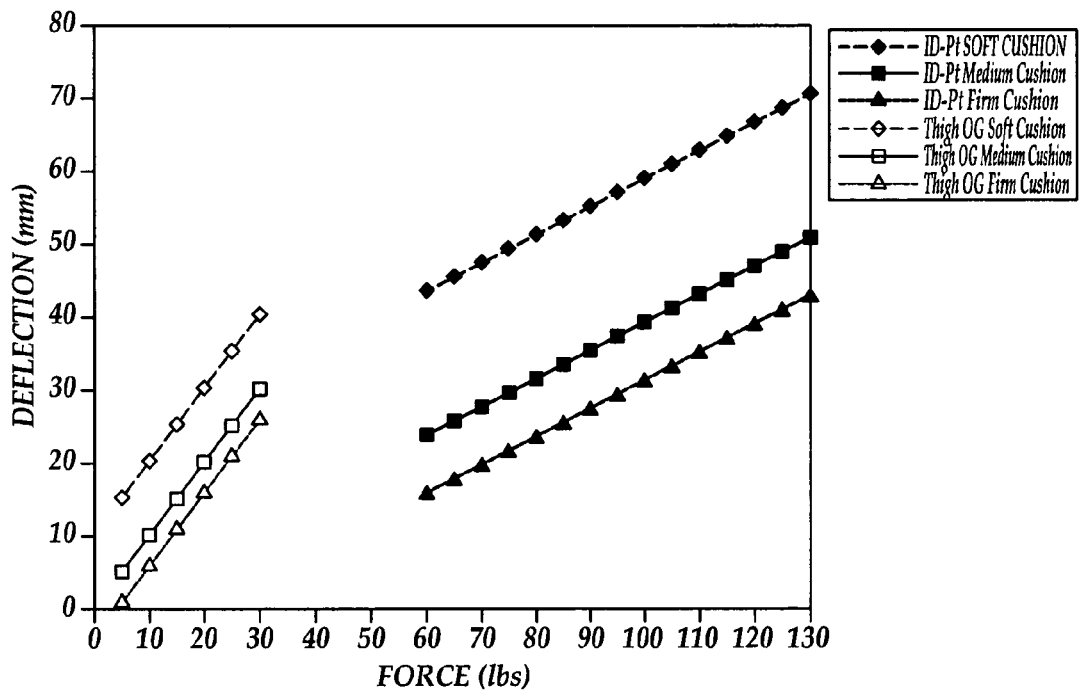
FIG. 16 is an estimated force deflection curve for typical soft, medium and hard seats.

8. The method includes the step of estimating a first point on the occupied seat interface contour at $T^o$ on the design template 10 under occupant load. Mark the thigh center of gravity on the thigh link axis 48, ⅘'s of the thigh link length from the hip joint, and construct a line vertically downward (parallel to the gravity vector) to the contour on the thigh. The intersection of these two lines represents $T^o$ (FIG. 12).

9. The method includes the step of estimating a second point on the unoccupied seat interface contour at $T^U$. For example, at $T^o$, construct a circle with a radius equal to the thigh deflection value from FIG. 16 where thigh weight for each human body is found in Table 5. Mark the point at the highest horizontal tangent to the circle about the deflected $T^U$ point. Record the coordinates of highest tangential point. This point is the undeflected $T^U$ for the seat cushion 18.

TABLE 5

Seat Cushion Design Parameters for 3 Template Body Sizes.

| DESIGN PARAMETERS | OCCUPANT DIMENSION | 5th Percentile Female | 50th Percentile Male | 95th Percentile Male |
|---|---|---|---|---|
| Occupant Support Surface | Contact Width | Anthropmerry: Hip Width | Leg Splay | Leg Splay |
| | Thigh CG from Hpt | 162 mm | 189 mm | 207 mm |
| Cushion Deflection | Thigh Weight | 4.0 kg (8.8 lbs) | 6.2 kg (13.6 lbs) | 8.0 kg (17.6 lbs) |
| | Seat Deflection | FIG. 16 | FIG. 16 | FIG. 16 |

10. The method includes the step of plotting locations of $S^U$, $L^U$, $I_D^U$, and $T^U$ to form the unloaded contour of the seat 12 with the design template 10.

11. The method includes the step of optimally matching the unoccupied load support points ($S^U$, $L^U$, $I_D^U$, and $T^U$) for the other design templates 10 and postures to define the free, unoccupied contour in the seat 12.

12. The method also includes the step of defining the unoccupied load support zone for the thorax. The highest and lowest unoccupied load support points ($S^U$) from all design templates 10 define the area of the unoccupied free contour for the thorax in the seat 12. In general, $S^U$ at T6 (34d) in the 95th percentile male having the ERECT posture and T10 (34f) in the 5th percentile female having the SLUMPED posture define the limits. Record the coordinates of these points in the vehicle axis system and construct a best fit line to represent the free, unoccupied seat contour for the thorax.

13. The method also includes the step of defining the free, unoccupied seat contour for the lumbar. The highest and lowest unoccupied points ($L^U$) from all appropriate design template contours define the area of the lumbar load support zone. The height locations define the location and range of adjustment needed for lumbar support, if required. Some seat deflections may permit the definition of a fixed lumbar support that may be built into the seat 12 or a two-way adjustable lumbar support in the fore-aft direction. Record the coordinates of these points in the vehicle axis system and construct a best fit line to represent the free, unoccupied seat contour for the lumbar.

14. The method also includes the step of defining the free, unoccupied seat contour for the ischium, i.e., butt pocket. The furthest forward and the furthest rearward unoccupied support points ($I_D^U$) from all design templates 10 define the area of the free, unoccupied seat contour at the butt pocket in the seat cushion 18. Record the coordinates of the $I_D^U$ points in the vehicle axis system and construct a best fit line to define the unoccupied load support zone for the ischium.

15. The method also includes the step of defining the area for the seat suspension in the seat 12. The furthest forward and the furthest rearward ischial load points ($I_D^o$) from all design templates 10 determine the area for the seat suspension. In general, the 95th percentile male having the SLUMPED posture and the 5th percentile female having the ERECT posture define the limits. Record the coordinates of the $I_D^o$ points in the vehicle axis system and construct a best fit line to define the occupied load support zone for the ischium.

16. The method also includes the step of defining the free, unoccupied seat contour for the thigh. The furthest forward and furthest rearward unoccupied points in the thigh ($T^U$) from all design templates 10 determine the area for the unoccupied thigh support zone. The method includes the step of constructing a free seat contour through $T^U$ for each of the design templates 10. For example, compare the results at $T^U$ between the design templates 10 of the 5th percentile female and the 95th percentile male. The distance between the extreme locations should define the seat cushion bolster region. Record the coordinates of these points in the vehicle axis system and construct a best-fit line to represent the unoccupied load support zone for the thigh.

17. The method also includes the step of defining the waterfall region of the unoccupied seat 12. The waterfall at this bolster region should be designed so that the contour from $T^U$ to the edge of the seat 12 diminishes with only trim contacting the back of the calf in the seated design template 10 of the 5th percentile female having the ERECT posture. Record the coordinates of these points in the vehicle axis system and construct a best fit line to represent the unoccupied load support zone for the thigh.

The Seat

The seat 12 is composed of two structural members: (1) a seat cushion 18 that primarily supports the human body occupant's torso weight under the ischium and the weight of the human body occupant's thigh, and (2) a seat back 20 that supports the human body occupant's back primarily in the thoracic and lumbar regions. The seat cushion 18 is typically composed of five primary structures: a) upholstery or trim, typically a woven cloth material or leather; b) deformable pad, typically foam; c) a suspension under the butt pocket, typically metal springs attached to metal wires and/or straps; d) an anti-submarining region forward of the suspension; and e) a rigid frame, typically sheet metal with sufficient shape and strength to support the human body occupant load. The seat back 20 is typically composed of four primary structures and one optional structure: a) upholstery or trim, typically a woven cloth material or leather covering of the seat back 20; b) deformable pad, typically foam; c) a rigid frame, typically a tube of metal in an inverted U-shape; d) a structural cross member spanning the vertical frame near the base of the seat back 20 to prevent occupant penetration of the seat back 20 in a vehicle collision; and e) an optional lumbar support, typically a deformable basket or inflatable bag(s) support the lumbar region of the human body occupant.

The design templates 10 are used to define the loaded contours of the seat 12 and the location of supporting and restraining structures, or their absence, as required for different postures and different body sizes. The design templates 10 are positioned relative to preferred torso angles (Tables 2 and 3). In general, the ERECT posture will sit in a range from 8° to 14°, NEUTRAL in a range from 14° to 22° and SLUMPED in a range from 20° to 28°. The $I_D$ point lies on an inclined plane that is defined by the change in weight transmitted from the seat cushion 18 to the seat back 20 as the human body occupant changes postures from ERECT to SLUMPED. The inclination of the seat cushion 18 is defined by thigh angle (Table 2).

A method, according to the present invention, is disclosed of using the design template 10 to design the seat 12 for a motor vehicle. In general, the method includes the steps of providing the design template 10 having the torso section 22 being one of a group comprising the $95^{th}$ percentile male, $50^{th}$ percentile male and $5^{th}$ percentile female having either an ERECT posture, a NEUTRAL posture or a SLUMPED posture. The method includes the steps of establishing occupant accommodation criteria in a vehicle package based on a predetermined class of vehicles and positioning the design template 10 in a vehicle to define seat height and seat track displacement to accommodate each design template 10 on a seat 12 having a seat cushion 18 and a seat back 20 in a vehicle representing the vehicle package criteria. The method also includes the step of defining at least one from a group comprising unloaded contours on the seat at $S^U$, $L^U$, $I_D^U$ and $T^U$. The method further includes the step of defining at least one from a group comprising a seat back height, seat cushion length, head restraint position, thorax support, lumbar support, seat back bite line region, seat cushion bite line region, seat cushion bolster (e.g., waterfall region) and seat suspension for the seat 12 relative to the design template 10.

Seat Back Height

The method includes the step of defining a seat back height for the seat relative to the design template 10.

1. Seat back height should not exceed $T2^u$ on the torso section 22 of the $50^{th}$ percentile male having the ERECT posture.

2. The top cross member of the seat back frame should not be lower than $T4^o$ on the torso section 22 of the $50^{th}$ percentile male having the ERECT posture.

Head Restraint Position

The method includes the step of defining a head restraint position for the seat 12 relative to the design template 10.

1. The back of the head for the torso section 22 of the $95^{th}$ percentile male having the ERECT posture defines the lowest maximum height of the head restraint.

2. The back of the head for the torso section 22 of the $95^{th}$ percentile male having the ERECT posture is 170 mm behind the eye.

Figure 6:
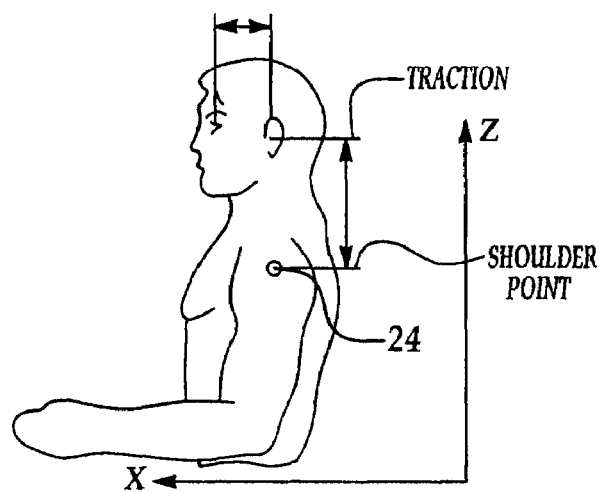
FIG. 6 is an elevational view of a human body occupant illustrating eye location relative to a shoulder point.

3. The eye is calculated according to the procedure described previously (Table 4 and FIG. 6).

Thorax Support

The method includes the step of defining a thorax support for the seat 12 relative to the design template 10.

1. The highest and lowest thorax load points ($S^u$) from all design template contours define the area of thorax support. In general, $S^u$ at T6 in the $95^{th}$ percentile male having the ERECT posture and T10 in the $5^{th}$ percentile female having the SLUMPED posture design templates 10 define the limits.

Lumbar Support

The method includes the step of defining a lumbar support for the seat 12 relative to the design template 10.

1. Structural mechanics of the seat back deformable pad designed so that the pad bends easily at $T12^o$ for the torso section 22 of the $95^{th}$ percentile male having the ERECT posture and at $S1^o$ for the torso section 22 of the $95^{th}$ percentile male having the ERECT posture.

2. The horizontal displacement of an adjustable lumbar support should lie at $L^o$ between L3 and L4 for the torso section 22 of the $95^{th}$ percentile male having the ERECT posture.

3. The vertical displacement of an adjustable lumbar support should lie at $L^o$ between L2 and L5 for the torso section 22 of the $95^{th}$ percentile male having the ERECT posture.

Seat Back Bite Line Region

The method includes the step of defining a seat back bite line region for the seat 12 relative to the design template 10.

1. Structure in the seat back 20 to restrain rearward motion of the human body occupant into the seat back 20 should lie within the region bounded by S1 for the torso section 22 of the $95^{th}$ percentile male having the ERECT posture and S1 for the torso section 22 of the $5^{th}$ percentile female having the NEUTRAL posture.

2. No non-deformable structures should be placed in the seat back 20 below S1 for the torso section 22 of the $5^{th}$ percentile female having the NEUTRAL posture.

Seat Cushion Bite Line Region

The method includes the step of defining a seat cushion bite line region for the seat 12 relative to the design template 10.

1. Non-deformable structures should not rise above the horizontal tangent at the $I_D^o$ contour of the $95^{th}$ percentile male having the ERECT posture.

2. Non-deformable structures should not be placed further forward in the seat cushion 18 than a line formed tangent to $S^o$ and $L^o$ on the interface contour 23a of the $95^{th}$ percentile male having the ERECT posture.

Seat Suspension

The method includes the step of defining a seat suspension for the seat 12 relative to the design template 10.

1. The furthest forward and the furthest rearward ischial load points $I_D^o$ for the torso section 22 from all design templates 10 determine the area for the seat suspension. In general, the design templates 10 for the $95^{th}$ percentile male having the SLUMPED posture and the $5^{th}$ percentile female having the ERECT posture define the limits.

2. The suspension accommodates the range in 1 above when designed from a vertical line passing through H-point in the 95percentile male having the NEUTRAL posture to extend forward 170 mm to the $95^{th}$ percentile male having the SLUMPED posture $I_D^o$ point and rearward 30 mm to the 5$^{th}$ percentile female having the ERECT posture $I_D^o$ point.

3. The forces on the seat suspension are determined from the torso angle for each design template 10 (FIGS. 13 through 16). The force-deflection characteristics of the suspension are estimated using the relative deflection for each design template 10.

Anti-Submarining Structures

The method includes the step of defining a region in the forward part of the seat cushion 18 that prevents forward motion of the pelvis in a vehicle collision.

1. The anti-submarining region in the seat cushion 18 lies between the most forward point of the seat suspension and the frame of the seat 12 at the nose of the seat cushion 18. In general, this anti-submarining region does not support vertical loads from human body weight but acts to restrain the forward horizontal motion of the human body occupant in a collision environment. It is therefore, important, that the anti-submarining region have low resistance to vertical loads.

2. In addition, the anti-submarining region in the seat cushion 18 has a vertical barrier in the seat frame at the nose of the seat cushion 18 to prevent horizontal motion of the ischium 30 of the design template 10 past the nose of the seat cushion 18. The design template 10 for the 5$^{th}$ percentile female having the ERECT posture determines the minimum height of this vertical barrier in the seat frame.

3. The forces on the vertical barrier are determined by the impact conditions and the size of the human body occupant. Thus, the structural materials and their strength must comply with any federal or state regulations concerning forces acting on the restraint system in a motor vehicle.

Seat Cushion Length

The method includes the step of defining a seat cushion length for the seat 12 relative to the design template 10.

1. Construct a circle about the occupied seat point $I_D^o$ on the 95$^{th}$ percentile male having the ERECT posture with a 385 mm radius to define the maximum length of the seat cushion 18. Seat cushion length should not exceed the distance from the 5$^{th}$ percentile female having the ERECT posture $I_D$ point to a vertical line passing through the 5th percentile female having the NEUTRAL posture knee point with the thigh axis (from Hip joint to Knee point) parallel to the deformed seat contour line.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A design template for use in designing a seat, comprising:
   a torso selected from a group defined by at least thee sample torsos, each torso within the group having one of an ERECT posture, a NEUTRAL posture and a SLUMPED posture; and,
   indicia located on the torso, the indicia representing skeletal landmarks, the landmarks corresponding to load bearing points relative to the seat, at least one of the skeletal landmarks represented by the indicia being an ischial tuberosity, the indicia further including a shoulder joint, a neck/shoulder junction and a sternum.

2. A design template, as set forth in claim 1, wherein the three sample torsos correspond to a large percentile male, a medium percentile male, and a small percentile female.

3. A design template, as set forth in claim 1, wherein the three sample torsos correspond to a 95th percentile male, a 50th percentile male and a 5th percentile female.

4. A design template, as set forth in claim 1, wherein the group defined by at least three sample torsos include an additional sample torso.

* * * * *

UNITED STATES PATENT AND TRADEMARK OFFICE
CERTIFICATE OF CORRECTION

PATENT NO. : 7,347,114 B2
APPLICATION NO. : 11/085772
DATED : March 25, 2008
INVENTOR(S) : Herbert M. Reynolds et al.

It is certified that error appears in the above-identified patent and that said Letters Patent is hereby corrected as shown below:

Column 20, line 20, delete "thee" and replace with --three--.

Signed and Sealed this

First Day of July, 2008

JON W. DUDAS
*Director of the United States Patent and Trademark Office*